(12) United States Patent
Bai et al.

(10) Patent No.: US 10,198,329 B2
(45) Date of Patent: Feb. 5, 2019

(54) POWER SUPPLY DEVICE

(71) Applicants: INVENTEC TECHNOLOGY CO., LTD, Shanghai (CN); INVENTEC CORPORATION, Taibei (TW)

(72) Inventors: Erhu Bai, Shanghai (CN); Jianxin Huang, Shanghai (CN)

(73) Assignees: INVENTEC TECHNOLOGY CO., LTD, Shanghai (CN); INVENTEC CORPORATION CO., LTD, Taibei (CN)

( * ) Notice: Subject to any disclaimer, the term of this patent is extended or adjusted under 35 U.S.C. 154(b) by 136 days.

(21) Appl. No.: 15/223,415

(22) Filed: Jul. 29, 2016

(65) Prior Publication Data

US 2017/0031789 A1   Feb. 2, 2017

(51) Int. Cl.
*G06F 11/20* (2006.01)
*G06F 11/30* (2006.01)
*G06F 11/32* (2006.01)

(52) U.S. Cl.
CPC ...... *G06F 11/2015* (2013.01); *G06F 11/3006* (2013.01); *G06F 11/325* (2013.01); *G06F 2201/805* (2013.01)

(58) Field of Classification Search
CPC ...... G06F 11/20; G06F 11/2015; G06F 11/30; G06F 11/3006
USPC ........................................................ 714/14
See application file for complete search history.

(56) References Cited

U.S. PATENT DOCUMENTS

| | | | | |
|---|---|---|---|---|
| 3,757,302 A | * | 9/1973 | Pollitt | G01R 19/16547 361/71 |
| 4,095,094 A | * | 6/1978 | Struger | G05B 19/058 714/31 |
| 5,664,089 A | * | 9/1997 | Byers | G06F 11/1415 714/14 |
| 5,993,039 A | * | 11/1999 | Crill | G05B 9/02 700/292 |
| 6,020,717 A | * | 2/2000 | Kadouchi | B60L 11/1851 320/116 |
| 6,621,247 B1 | * | 9/2003 | Bulling | G01R 19/16542 320/116 |
| 7,486,050 B2 | * | 2/2009 | Hidaka | G01R 19/16542 320/116 |
| 2008/0082849 A1 | * | 4/2008 | Takahashi | G06F 1/263 713/340 |

(Continued)

*Primary Examiner* — Kamin B Patel
(74) *Attorney, Agent, or Firm* — Oliff PLC (57) ABSTRACT

A power supply device including a working power supply module with a plurality of power supply units; a plurality of monitoring units outputting a power failure signal when the corresponding power supply unit is in a power failure; a plurality of latching units respectively corresponding to the plurality of monitoring units one to one, receiving the power failure signal and a disabling signal, and outputting a latching signal when the power failure signal is received but the disabling signal is not received; and a positioning module used for receiving the latching signal and outputting a disabling signal when the positioning module receives a first latching signal output by one latching unit to disable other latching units, so as to enable the positioning module to position the latching unit which firstly outputs the latching signal to position the corresponding power supply unit which is firstly in a power failure.

11 Claims, 2 Drawing Sheets

(56) References Cited

U.S. PATENT DOCUMENTS

2010/0141320 A1* 6/2010 Lin .................... H03K 5/05
 327/198
2013/0120056 A1* 5/2013 Rountree ............ H02M 3/07
 327/540

* cited by examiner

POWER SUPPLY DEVICE

BACKGROUND OF THE PRESENT INVENTION

Field of the Invention

The present invention relates to the field of server power supply, in particular to a power supply device which can position a power supply unit which is in a power failure.

Description of Related Arts

As an IT basic device, a server itself has many modules and voltage needed by each module is different in most cases. Therefore, there are more than ten types of power supplied to the server. As long as one type of power fails, the server will be caused to be powered off within tens of milliseconds on the whole. Therefore, it is very valuable for research and development personnel, maintenance personnel and customers to quickly and accurately judge which type of power that firstly fails and causes an overall power failure to the server from more than ten or more types of power.

SUMMARY OF THE PRESENT INVENTION

In view of the disadvantages of the prior art, the purpose of the present invention is to provide a power supply device, which is used for solving the problem that a power supply unit which causes a power failure to a server cannot be quickly and accurately found out in the prior art.

In order to realize the above-mentioned and other related purposes, the present invention provides a power supply device, which is applicable to a server system and comprises a working power supply module comprising a plurality of power supply units, each power supply unit being used for respectively supplying power to a plurality of load circuits of the server system; a plurality of monitoring units respectively corresponding to the plurality of power supply units one to one, monitoring a state of the corresponding power supply unit and outputting a power failure signal when the corresponding power supply unit is in a power failure; a plurality of latching units respectively corresponding to the plurality of monitoring units one to one, receiving the power failure signal output by the corresponding monitoring unit and a disabling signal, and outputting a latching signal when the power failure signal is received but the disabling signal is not received; and a positioning module electrically connected with the plurality of latching units and used for receiving the latching signal and outputting a disabling signal when the positioning module receives a first latching signal output by one latching unit to disable other latching units, so as to enable the other latching units not to output the corresponding latching signals any longer and enable the positioning module to position the latching unit which firstly outputs the latching signal to position the corresponding power supply unit which is firstly in a power failure.

In one embodiment of the present invention, when the server system is powered on, each power supply unit receives a power supply enabling signal, starts to be powered on and outputs a good power supply signal to the corresponding monitoring unit during normal power supply; and when the power supply unit is in a power failure, the power supply enabling signal is effective, the good power supply signal is ineffective and the monitoring unit outputs the power failure signal.

In one embodiment of the present invention, when at least one or more of power supply units are in a power failure in a process that the working power supply module is powered on, the working power supply module outputs a critical working power supply error signal; when all of the plurality of power supply units normally supply power, the working power supply module outputs a steady working power supply state signal; and the monitoring unit enables a function of outputting the power failure signal only when the monitoring unit receives one of the critical working power supply error signal and the steady working power supply state signal.

In one embodiment of the present invention, the power supply device further comprises a plurality of judgment units corresponding to the latching units one to one, and the judgment units are used for executing corresponding actions according to latching results of the latching units to find out the power supply unit which is firstly in a power failure.

In one embodiment of the present invention, the judgment units comprise LED lamps or buzzers; and the corresponding actions comprise turning-on or turning-off of the LED lamps or/and buzzing or turning-off of the buzzers, so as to provide convenience to maintenance personnel to quickly find out the power supply unit which is firstly in a power failure according to the change of the states of the LED lamps or buzzers.

In one embodiment of the present invention, the monitoring unit comprises a NOT gate, a first AND gate, an OR gate and a data selector; and the NOT gate is electrically connected with the first AND gate, and the first AND gate and the OR gate are respectively and electrically connected with the data selector.

In one embodiment of the present invention, an input end of the NOT gate receives the good power supply signal, a first input end of the first AND gate receives the power supply enabling signal output by the power supply unit, an output end of the NOT gate is electrically connected with a second input end of the first AND gate, an output end of the first AND gate is electrically connected with a first input end of the data selector, a second input end of the data selector is set at a low level, a first input end of the OR gate receives the steady working power supply state signal, a second input end of the OR gate receives the critical working power supply error signal, and an output end of the OR gate is electrically connected with a selection pin of the data selector.

In one embodiment of the present invention, when the monitoring unit receives one of the critical working power supply error signal or the steady working power supply state signal, an output of the first AND gate is selected as an output of the data selector; and when the power supply unit is in a power failure, the power supply enabling signal is high-level, the good power supply signal is low-level and an output of the data selector is the power failure signal which is high-level.

In one embodiment of the present invention, the latching unit comprises a latch and a second AND gate, an output end of the data selector is electrically connected with a first input end of the second AND gate, a second input end of the second AND gate receives the disabling signal, an output end of the second AND gate is electrically connected with an enabling pin of the latch, an input end of the latch is set at a low level and an initial state of an output end of the latch is high-level.

In one embodiment of the present invention, the positioning module comprises a third AND gate, output ends of latches of each latching unit are respectively and electrically connected with an input end of the third AND gate, and an output end of the third AND gate is electrically connected with the second input end of the second AND gate; and when the monitoring unit receives one of the critical working power supply error signal and the steady working power supply state signal and detects the power failure signal output by the corresponding power supply unit, the output end of the latch of the corresponding latching unit outputs a low-level signal, and the positioning module outputs a disabling signal according to the received low-level signal.

In one embodiment of the present invention, the output end of the latch is electrically connected with a cathode of an LED lamp, an anode of the LED lamp is electrically connected with an external power supply, and the LED lamp is used for being turned on or turned off according to an output result of the latch; and/or the output end of the latch is electrically connected with one end of a buzzer, the other end of the buzzer is electrically connected with an external power supply, and the buzzer is used for buzzing or being turned off according to an output result of the latch.

As described above, the power supply device provided by the present invention is applicable to a server system and comprises a working power supply module comprising a plurality of power supply units, each power supply unit being used for respectively supplying power to a plurality of load circuits of the server system; a plurality of monitoring units respectively corresponding to the plurality of power supply units one to one, monitoring a state of the corresponding power supply unit and outputting a power failure signal when the corresponding power supply unit is in a power failure; a plurality of latching units respectively corresponding to the plurality of monitoring units one to one, receiving the power failure signal output by the corresponding monitoring unit and a disabling signal, and outputting a latching signal when the power failure signal is received but the disabling signal is not received; and a positioning module electrically connected with the plurality of latching units and used for receiving the latching signal and outputting a disabling signal when the positioning module receives a first latching signal output by one latching unit to disable other latching units, so as to enable the other latching units not to output the corresponding latching signals any longer and enable the positioning module to position the latching unit which firstly outputs the latching signal to position the corresponding power supply unit which is firstly in a power failure. The power supply device provided by the present invention can help device maintenance personnel to quickly find out the power supply unit which causes the power failure to the server.

DESCRIPTION OF COMPONENT MARK NUMBERS 1, 2 Power supply device
11, 21 Working power supply module
111, 112, 211, 212 Power supply unit
12, 22 Monitoring module
121, 122, 221, 222 Monitoring unit
13, 23 Latching module
131, 132, 231, 232 Latching unit
14, 24 Positioning module
25 Judgment module
251, 252 Judgment unit

DETAILED DESCRIPTION OF THE PREFERRED EMBODIMENTS

The implementation mode of the present invention will be described below through specific embodiments. One skilled in the art can easily understand other advantages and effects of the present invention according to contents disclosed by the description. The present invention can also be implemented or applied through other different specific implementation modes. Various modifications or changes can also be made to all details in the description based on different points of view and applications without departing from the spirit of the present invention. It needs to be stated that the following embodiments and the features in the embodiments can be combined with one another under the situation of no conflict.

It needs to be stated that the drawings provided in the following embodiments are just used for schematically describing the basic concept of the present invention, thus only illustrate components only related to the present invention and are not drawn according to the numbers, shapes and sizes of components during actual implementation, the configuration, number and scale of each component during actual implementation thereof may be freely changed, and the component layout configuration thereof may be more complex.

Figure 1:
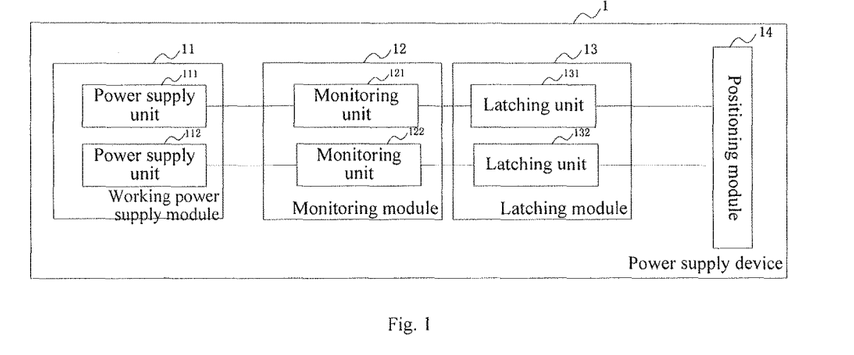
FIG. 1 illustrates a schematic module diagram of a power supply device of the present invention in one specific embodiment.

Please refer to FIG. 1, which illustrates a schematic module diagram of a power supply device of the present invention in one specific embodiment. As shown in FIG. 1, the power supply device 1 is applicable to a server system and comprises a working power supply module 11, a monitoring module 12, a latching module 13 and a positioning module 14.

The working power supply module 11 comprises a power supply unit 111 and a power supply unit 112. In actual application, the number of the power supply units of the server is more than ten and the power supply units are used for respectively supplying power to corresponding load circuits of the server system. This embodiment is exemplarily described temporarily by taking the number of the power supply units as two, but not limited thereto. In other embodiments, the number of the power supply units can be any number more than two according to the actual application situation.

The monitoring module 12 comprises a monitoring unit 121 which is electrically connected with the power supply unit 111 and a monitoring unit 122 which is electrically connected with the power supply unit 112. The monitoring unit 121 is used for monitoring a state of the power supply unit 111 and outputting a power failure signal when the power supply unit 111 is in a power failure; the monitoring unit 122 is used for monitoring a state of the power supply unit 112 and outputting a power failure signal when the power supply unit 112 is in a power failure; and the number of the monitoring units corresponds to the number of the power supply units of the power supply module, i.e., when the number of the power supply units of the power supply module is more than two, the number of the monitoring units is more than two corresponding to the number of the power supply units.

The latching module 13 comprises a latching unit 131 which is electrically connected with the monitoring unit 121 and a latching unit 132 which is electrically connected with the monitoring unit 122. The latching unit 131 receives the power failure signal output by the monitoring unit 121 and a disabling signal, and outputs a latching signal when the power failure signal output by the monitoring unit 121 is received but the disabling signal is not received; and the latching unit 132 receives the power failure signal output by the monitoring unit 122 and a disabling signal, and outputs a latching signal when the power failure signal output by the monitoring unit 122 is received but the disabling signal is not received. The number of the latching units corresponds to the number of the monitoring units, i.e., when the number of the monitoring units is more than two, the number of the latching units is more than two corresponding to the number of the monitoring units.

The positioning module 14 is electrically connected with the latching unit 131 and the latching unit 132 of the latching module 13 and is used for receiving the latching signal output by the latching unit 131 or the latching unit 132 and outputting a disabling signal when the positioning module 14 receives a first latching signal output by one latching unit 131 or the latching unit 132 of the latching module 13. For example, when the latching unit 131 firstly outputs the latching signal, the positioning module 14 disables the other latching unit 132, so as to enable the other latching unit 132 not to output the corresponding latching signal any longer and enable the positioning module 14 to position the latching unit 131 which firstly outputs the latching signal to position the corresponding power supply unit 111 which is firstly in a power failure.

In actual application, when the server system is powered on, each power supply unit receives a power supply enabling signal, starts to be powered on and outputs a good power supply signal to the corresponding monitoring unit during normal power supply; and when the power supply unit is in a power failure, the power supply enabling signal is effective, the good power supply signal is ineffective and the monitoring unit outputs the power failure signal.

Preferably, when at least one or more of power supply units are in a power failure in a process that the working power supply module is powered on, the working power supply module outputs a critical working power supply error signal; when the plurality of power supply units normally supply power, the working power supply module outputs a steady working power supply state signal; and the monitoring unit enables a function of outputting the power failure signal only when the monitoring unit receives one of the critical working power supply error signal and the steady working power supply state signal.

Figure 2:
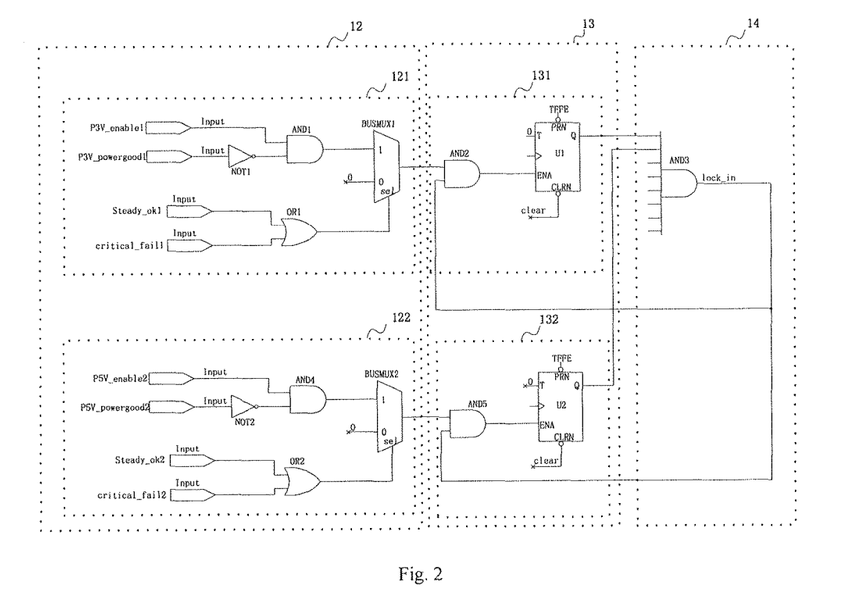
FIG. 2 illustrates a schematic circuit diagram of the power supply device as shown in FIG. 1.

Refer to FIG. 2, which illustrates a schematic circuit diagram of the power supply device as shown in FIG. 1. As shown in FIG. 2, the schematic circuit diagram FIG. 2 corresponds to the module diagram of the power supply device as shown in FIG. 1 and comprises schematic circuit diagrams corresponding to the monitoring module 12, the latching module 13 and the positioning module 14. Since the circuit structures of the monitoring units are the same and the circuit structures of the latching units are the same, the description is made by respectively taking the connection of the schematic circuit diagrams of the monitoring unit 121, the latching unit 131 and the positioning module 14 as an example. Undoubtedly, one skilled in the art can obtain the structures and connection situations of other parts of the circuits according to the description of this embodiment in combination with FIG. 2.

Please refer to FIG. 2. The description is made by taking the monitoring unit 121 as an example. The monitoring unit 121 comprises a NOT gate NOT1, a first AND gate AND1, an OR gate OR1 and a data selector BUSMUX1; and the NOT gate NOT1 is electrically connected with the first AND gate AND1, and the first AND gate AND1 and the OR gate OR1 are respectively and electrically connected with the data selector BUSMUX1.

Preferably, an input end of the NOT gate NOT1 receives the good power supply signal, the good power supply signal is expressed as P3V_powergood1 in this embodiment, a first input end of the first AND gate AND1 receives the power supply enabling signal output by the power supply unit 111, the power supply enabling signal is expressed as P3V_enable1 in this embodiment, an output end of the NOT gate NOT1 is electrically connected with a second input end of the first AND gate AND1, an output end of the first AND gate AND1 is electrically connected with a first input end of the data selector BUSMUX1, a second input end of the data selector BUSMUX1 is set at a low level, a first input end of the OR gate OR1 receives the steady working power supply state signal, the steady working power supply state signal is expressed as Steady_ok1 in this embodiment, a second input end of the OR gate OR1 receives the critical working power supply error signal, the critical working power supply error signal is expressed as critical_fail1, and an output end of the OR gate OR1 is electrically connected with a selection pin of the data selector BUSMUX1.

Preferably, when the monitoring unit 121 receives one of the critical working power supply error signal or the steady working power supply state signal, the monitoring unit 121 selects an output of the first AND gate AND1 as an output of the data selector BUSMUX1; and when the power supply unit 111 is in a power failure, the power supply enabling signal is high-level, i.e., P3V_enable1 is high-level, the good power supply signal is low-level, i.e., P3V_powergood1 is low-level, and an output of the data selector BUSMUX1 is the power failure signal which is high-level.

In addition, further referring to FIG. 2, the latching unit 131 comprises a latch U1 and an AND gate AND2, an output end of the data selector BUSMUX1 is electrically connected with a first input end of the AND gate AND2, a second input end of the AND gate AND2 receives the disabling signal, an output end of the AND gate AND2 is electrically connected with an enabling pin of the latch U1, an input end of the latch U1 is set at a low level and an initial state of an output end of the latch U1 is high-level.

Preferably, further referring to FIG. 2, the positioning module 14 comprises an AND gate AND3, output ends of latches of all latching units are respectively and electrically connected with an input end of the AND gate AND3, the electric connection mode between the latching units and the positioning module 14 is the same, the description hereby is made by taking the connection between the latching unit 131 and the positioning module 14 as an example, an output end of the latch of the latching unit 131 is electrically connected with an input end of the AND gate AND3, and an output end of the AND gate AND3 is electrically connected with the second input end of the AND gate AND2; and when the monitoring unit 121 receives one of the critical working power supply error signal and the steady working power supply state signal and detects the power failure signal output by the corresponding power supply unit, the output end of the latch U1 of the corresponding latching unit 131 outputs a low-level signal, and the positioning module 14 outputs a disabling signal according to the received low-level signal, so as to enable the output of the AND gate AND 2 of the latching unit 131 to be low-level, i.e., enable the enabling input signal of the latch U1 to be low-level, thereby enabling the output of each latching unit to be latched in a state when a certain power supply unit is in a power failure.

The working principle of the present invention will be exemplarily described below in detail by taking the power failure of the power supply unit 111 in a steady working power supply state as an example.

In the steady working power supply state, the steady working power supply state signal Steady_ok1 is high-level 1, the output of the OR gate OR1 is 1 and the data selector BUSMUX2 selects an output of the AND gate AND 1 as an output thereof; at this moment, since the power supply unit 111 is in a power failure, the power supply enabling signal is high-level 1, i.e., P3V_enable1 is high-level 1, the good power supply signal is low-level 0, i.e., P3V_powergood1 is low-level 0, the output of the data selector BUSMUX1 is the power failure signal of high-level 1, the first input end of the AND gate AND2 is the power failure signal, i.e., is high-level, and the second end of the AND gate AND2 receives the disabling signal; since the output ends of the latches U1 and U2 are defaulted to be high-level and the initial disabling signal is an initial output signal of the AND gate AND3, i.e., is high-level, the second input end of the AND gate AND 2 is high-level, the latch U1 is enabled; and since the default input signal of each latch is 0 as shown in FIG. 2, the latch U1 is enabled, the output of the latch U1 is 0, thereby the output of the AND gate AND3 is enabled to be 0, i.e., the disabling signal becomes low-level 0, simultaneously the output of the AND gate AND2 of the latching unit 131 and the output of the AND gate AND5 of the latching unit 132 are enabled to be 0, thereby the inputs of the enabling ends of the latch U1 and the latch U2 are enabled to be low-level 0, thereby the outputs of the latching unit 131 and the latching unit 132 are enabled to be kept in a changed state when the first power supply unit 111 is in a power failure and be kept unchanged, maintenance personnel can determine the power supply unit 111 corresponding to the latching unit 131 in a level state which is low-level 0 as the power supply unit 111 which is in a power failure by testing the level states of the outputs of the latching unit 131 and the latching unit 132.

Figure 3:
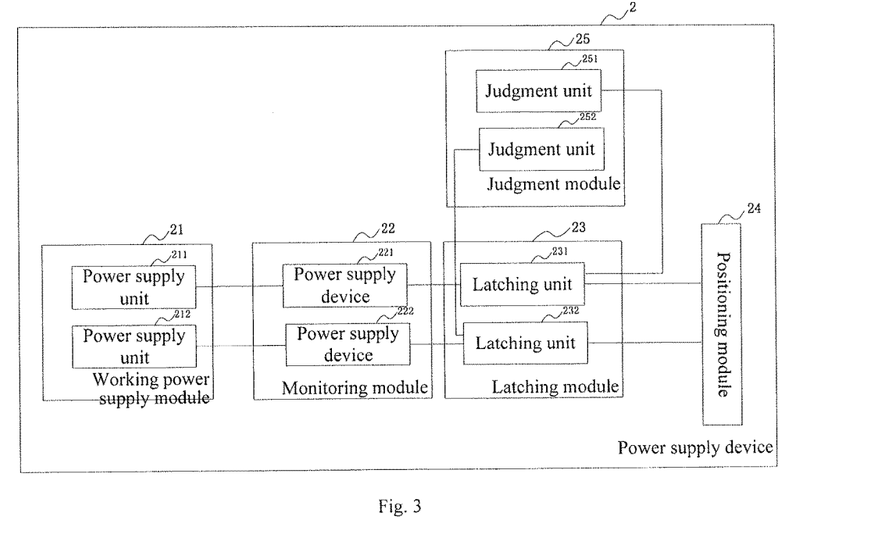
FIG. 3 illustrates a schematic module diagram of a power supply device of the present invention in one specific embodiment.

More preferably, referring to FIG. 3 which illustrates a schematic module diagram of a power supply device of the present invention in one specific embodiment, the power supply device 2 comprises a working power supply module 21, a monitoring module 22, a latching module 23 and a positioning module 24, wherein the monitoring module 22 comprises a monitoring unit 221 and a monitoring unit 222, the latching module 23 comprises a latching unit 231 and a latching unit 232, the application principle and technical solution of the working power supply module 21, the monitoring module 22, the latching module 23 and the positioning module 24 in this embodiment are the same as the working power supply module 11, the monitoring module 12, the latching module 13 and the positioning module 14 of the power supply device 1 as shown in FIG. 1, the description about of the application principle and technical solution of the working power supply module 11, the monitoring module 12, the latching module 13 and the positioning module 14 in FIG. 1 can be applied to this embodiment and thereby are not repetitively described here, the power supply device 2 in this embodiment further comprises a judgment module 25, the judgment module 25 comprises a judgment unit 251 which is correspondingly connected with the latching unit 231 and a judgment unit 252 which is correspondingly connected with the latching unit 232, the judgment unit 251 is used for executing a corresponding action according to a latching result of the latching unit 231, and the judgment unit 252 is used for executing a corresponding action according to a latching result of the latching unit 232, so as to find out the power supply unit which is firstly in a power failure according to a judgment result of the judgment unit 251 or the judgment unit 252. The judgment unit 251 or the judgment unit 252, for example, is an LED lamp or a buzzer, and the corresponding action comprises turning-on or turning-off of the LED lamp or/and buzzing or turning-off of the buzzer, so as to provide convenience to the maintenance personnel to quickly find out the power supply unit which is firstly in a power failure according to the change of the state of the LED lamp or the buzzer. The number of the judgment units corresponds to the number of the latching units. In other embodiments, when the number of the latching unit is more than two, the number of the judgment units is more than two corresponding to the number of the latching units.

Figure 4:
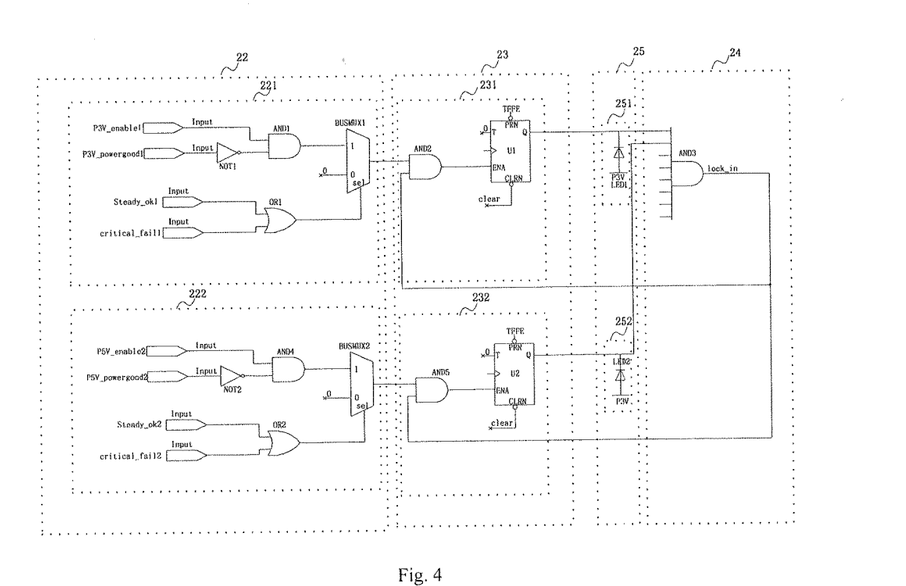
FIG. 4 illustrates a schematic circuit diagram of the power supply device as shown in FIG. 3.

Please refer to FIG. 4, which illustrates a schematic circuit diagram of the power supply device as shown in FIG. 3. The schematic circuit diagram as shown in FIG. 4 corresponds to the module diagram as shown in FIG. 3. In addition, correspondingly, different from the schematic circuit diagram as shown in FIG. 2, as shown in FIG. 4, the output end of the latch U1 of the latching unit 231 is electrically connected with the judgment unit 251, i.e., a cathode of an LED1, an anode of the LED1 is electrically connected with an external 3V power supply, and the LED1 is used for being turned on or turned off according to an output result of the latch U1, so as to allow the maintenance personnel to judge whether the power supply unit 211 corresponding to the latching unit 231 is in a power failure or not according to the change of the state of the LED1. The output end of the latch U2 of the latching unit 232 is electrically connected with the judgment unit 252, i.e., a cathode of an LED2, an anode of the LED2 is electrically connected with an external 3V power supply, and the LED2 is used for being turned on or turned off according to an output result of the latch U2, so as to allow the maintenance personnel to judge whether the power supply unit 212 corresponding to the latching unit 232 is in a power failure or not according the change of the state of the LED2.

In another specific embodiment, the output end of the latch of each latching unit can be electrically connected with one end of a buzzer, the other end of the buzzer is electrically connected with an external power supply, and the buzzer is used for buzzing or being turned off according to an output result of the latch, so as to allow the maintenance personnel to quickly position the power supply unit which is in a power failure according to the change of the state of the buzzer. Of course, in other specific embodiments, the judgment units can be other devices which can alert the change of the level state.

To sum up, the power supply device provided by the present invention is applicable to a server system and comprises a working power supply module comprising a plurality of power supply units, each power supply unit being used for respectively supplying power to a plurality of load circuits of the server system; a plurality of monitoring units respectively corresponding to the plurality of power supply units one to one, monitoring a state of the corresponding power supply unit and outputting a power failure signal when the corresponding power supply unit is in a power failure; a plurality of latching units respectively corresponding to the plurality of monitoring units one to one, receiving the power failure signal output by the corresponding monitoring unit and a disabling signal, and outputting a latching signal when the power failure signal is received but the disabling signal is not received; and a positioning module electrically connected with the plurality of latching units and used for receiving the latching signal and outputting a disabling signal when the positioning module receives a first latching signal output by one latching unit to disable other latching units, so as to enable the other latching units not to output the corresponding latching signals any longer and enable the positioning module to position the latching unit which firstly outputs the latching signal to position the corresponding power supply unit which is firstly in a power failure. The power supply device provided by the present invention can help device maintenance personnel to quickly find out the power supply unit which causes the power failure to the server. Therefore, the present invention effectively overcomes various disadvantages in the prior art and has a great industrial utilization value.

The above-mentioned embodiments are just used for exemplarily describing the principle and effects of the present invention instead of limiting the present invention. One skilled in the art can make modifications or changes to the above-mentioned embodiments without going against the spirit and the range of the present invention. Therefore, all equivalent modifications or changes made by those who have common knowledge in the art without departing from the spirit and technical concept disclosed by the present invention shall be still covered by the claims of the present invention.

What is claimed is:

1. A power supply device for a server system, comprising:
a working power supply module comprising a plurality of power supply units, each power supply unit being used for respectively supplying power to a plurality of load circuits of the server system;
a plurality of monitoring units respectively corresponding to the plurality of power supply units one to one, each monitoring unit monitoring a state of the corresponding power supply unit and outputting a power failure signal when the corresponding power supply unit is in a power failure;
a plurality of latching units respectively corresponding to the plurality of monitoring units one to one, each latching unit being configured to receive the power failure signal output by the corresponding monitoring unit, being configured to receive a disabling signal, and being configured to: when the power failure signal is received but the disabling signal is not received, output a latching signal; and
a positioning module electrically connected with the plurality of latching units and configured to: receive the latching signal output from any one of the plurality of latching units, when a first latching signal output by a first latching unit is received, output a disabling signal to disable a second latching unit that is different from the first latching unit, so as to enable the second latching unit to not output the corresponding latching signals any longer and enable the positioning module to position the first latching unit, which is the first to output the latching signal, to position the corresponding power supply unit which is firstly in a power failure.

2. The power supply device according to claim 1, wherein, when the server system is powered on, each power supply unit receives a power supply enabling signal, starts to be powered on and outputs a good power supply signal to the corresponding monitoring unit during normal power supply; and when the power supply unit is in a power failure, the power supply enabling signal is effective, the good power supply signal is ineffective and the monitoring unit outputs the power failure signal.

3. The power supply device according to claim 2, wherein, when at least one or more of power supply units are in a power failure in a process that the working power supply module is powered on, the working power supply module outputs a critical working power supply error signal; when the plurality of power supply units normally supply power, the working power supply module outputs a steady working power supply state signal; and the monitoring unit enables a function of outputting the power failure signal only when the monitoring unit receives one of the critical working power supply error signal and the steady working power supply state signal.

4. The power supply device according to claim 1, wherein the power supply device further comprises a plurality of judgment units corresponding to the latching units one to one, and the judgment units are used for executing corresponding actions according to latching results of the latching units to find out the power supply unit which is firstly in a power failure.

5. The power supply device according to claim 4, wherein the judgment units comprise LED lamps or buzzers; and the corresponding actions comprise turning-on or turning-off of the LED lamps or/and buzzing or turning-off of the buzzers.

6. The power supply device according to claim 3, wherein the monitoring unit comprises a NOT gate, a first AND gate, an OR gate and a data selector; and the NOT gate is electrically connected with the first AND gate, and the first AND gate and the OR gate are respectively and electrically connected with the data selector.

7. The power supply device according to claim 6, wherein an input end of the NOT gate receives the good power supply signal, a first input end of the first AND gate receives the power supply enabling signal output by the power supply unit, an output end of the NOT gate is electrically connected with a second input end of the first AND gate, an output end of the first AND gate is electrically connected with a first input end of the data selector, a second input end of the data selector is set at a low level, a first input end of the OR gate receives the steady working power supply state signal, a second input end of the OR gate receives the critical working power supply error signal, and an output end of the OR gate is electrically connected with a selection pin of the data selector.

8. The power supply device according to claim 7, wherein, when the monitoring unit receives one of the critical working power supply error signal or the steady working power supply state signal, the monitoring unit selects an output of the first AND gate as an output of the data selector; and when the power supply unit is in a power failure, the power supply enabling signal is high-level, the good power supply signal is low-level and an output of the data selector is the power failure signal which is high-level.

9. The power supply device according to claim 8, wherein the latching unit comprises a latch and a second AND gate, an output end of the data selector is electrically connected with a first input end of the second AND gate, a second input end of the second AND gate receives the disabling signal, an output end of the second AND gate is electrically connected with an enabling pin of the latch, an input end of the latch is set at a low level and an initial state of an output end of the latch is high-level.

10. The power supply device according to claim 9, wherein the positioning module comprises a third AND gate, output ends of latches of all latching units are respectively and electrically connected with an input end of the third AND gate, and an output end of the third AND gate is electrically connected with the second input end of the second AND gate; and when the monitoring unit receives one of the critical working power supply error signal and the steady working power supply state signal and detects the power failure signal output by the corresponding power supply unit, the output end of the latch of the corresponding latching unit outputs a low-level signal, and the positioning module outputs a disabling signal according to the received low-level signal.

11. The power supply device according to claim 10, wherein the output end of the latch is electrically connected with a cathode of an LED lamp, an anode of the LED lamp is electrically connected with an external power supply, and the LED lamp is used for being turned on or turned off according to an output result of the latch; and/or the output end of the latch is electrically connected with one end of a buzzer, the other end of the buzzer is electrically connected with an external power supply, and the buzzer is used for buzzing or being turned off according to an output result of the latch.

* * * * *

UNITED STATES PATENT AND TRADEMARK OFFICE
CERTIFICATE OF CORRECTION

PATENT NO. : 10,198,329 B2
APPLICATION NO. : 15/223415
DATED : February 5, 2019
INVENTOR(S) : Erhu Bai et al.

Page 1 of 1

It is certified that error appears in the above-identified patent and that said Letters Patent is hereby corrected as shown below:

On the Title Page

Item [30], insert:
-- July 29, 2015 (CN)........................ 2015104560863 --

Signed and Sealed this
Twentieth Day of August, 2019

Andrei Iancu
*Director of the United States Patent and Trademark Office*